United States Patent [19]
Murr et al.

[11] Patent Number: 4,798,641
[45] Date of Patent: Jan. 17, 1989

[54] METHOD OF FABRICATING A CABLE

[75] Inventors: Michael R. Murr, Hopewell Township, Mercer County; Jay R. Rajasekera, Mercer County, both of N.J.; Bruce C. Vrieland, Norcross, Ga.

[73] Assignee: American Telephone and Telegraph Company, New York, N.Y.

[21] Appl. No.: 907,288

[22] Filed: Sep. 15, 1986

[51] Int. Cl.$^4$ ............................................. B65H 69/06
[52] U.S. Cl. ....................................... 156/158; 65/4.21
[58] Field of Search ...................... 156/158, 64; 65/4.2, 65/4.21, 36; 350/96.1, 96.21; 364/552, 473; 209/552, 577, 579, 581, 582; 356/73.1

[56] References Cited

U.S. PATENT DOCUMENTS 4,439,221 3/1984 Smyth et al. ..................... 156/158 X
4,557,556 12/1985 Decker, Jr. .......................... 65/4.2 X

OTHER PUBLICATIONS

C. M. Jeffcoat et al., Conf. Proc., *International Conference of Optical Fiber Submarine Telecommunications Systems*, Versailles, France, Feb. 18–21, 1986.

Primary Examiner—Michael W. Ball
Assistant Examiner—Geoffrey L. Knable
Attorney, Agent, or Firm—Robert B. Levy

[57] ABSTRACT

A lightguide fiber (16), having predetermined losses, is fabricated from individual pieces (26) of fiber which are selected from an inventory thereof such that the median loss per unit length of pieces remains substantially the same after fiber fabrication. To fabricate the fiber, the inventory is first divided into a plurality of classes based on the following criteria: (1) whether each piece has a length above or below the average length of the pieces within the inventory. (2) whether each piece has a median loss per unit length above or below the median loss per unit length of the fiber to be fabricated, and (3) whether each piece has a variation in loss above or below a preselected value. Thereafter, the classes are successively examined, beginning with the first one, to determine whether any piece therein has transmission characteristics suitable for fabricating the fiber. If so, the piece is selected from the class. The step of successively examining the classes of pieces is repeated until the cumulative length of the selected pieces equals or exceeds the desired length of the fiber to be fabricated. The selected pieces are then joined end to end.

9 Claims, 4 Drawing Sheets

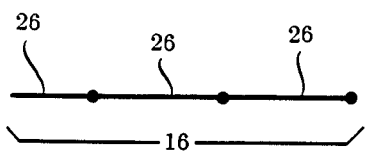
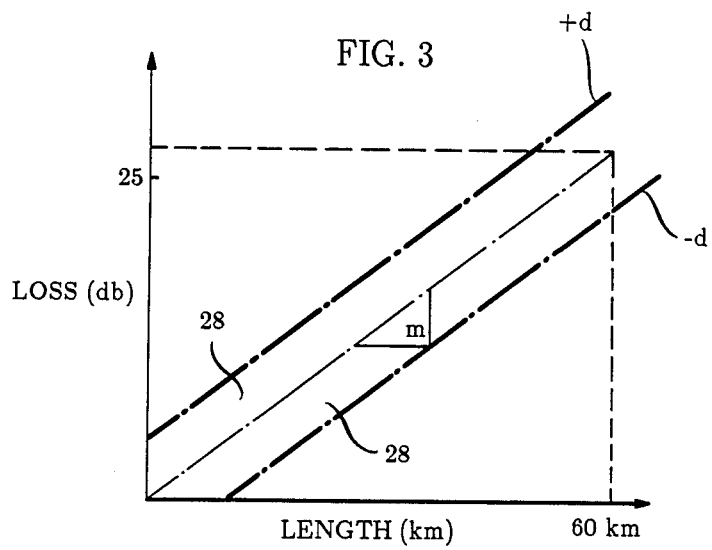
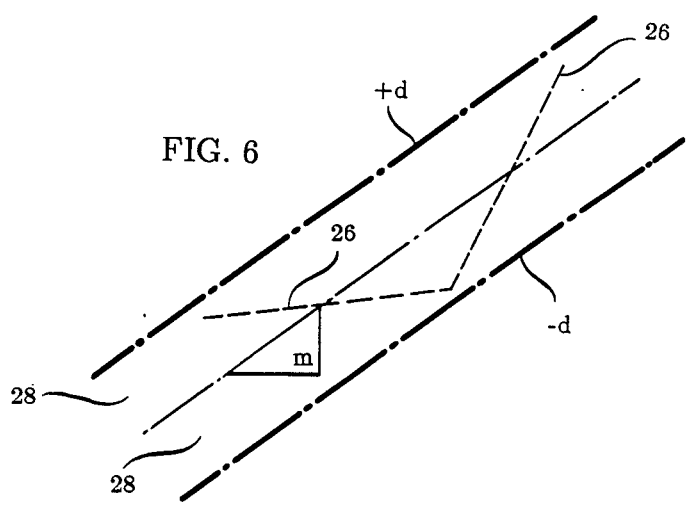

METHOD OF FABRICATING A CABLE

TECHNICAL FIELD

This invention relates to cable and a method of fabricating the same.

BACKGROUND ART

Lightguide fiber is quickly supplanting copper wire as the medium of choice for carrying communications signals. As compared to copper wire, lightguide fiber has a much higher bandwidth. Thus, lightguide fiber can carry more voice conversations than copper wire. Further, lightguide fiber exhibits lower losses so that fewer regenerators are required for a long-haul lightguide fiber cable than for one comprised of copper wire. An additional advantage of lightguide fiber is that unlike copper wire, lightguide fiber is immune to radio frequency interference.

While terrestrial, long-haul fiber cables have been in commercial use for several years, development of an undersea lightguide fiber cable is still under way. In fact, only recently was installation completed of the first experimental deep water, undersea lightguide fiber cable linking the islands Gran Canaria and Tenerife off the coast of Morocco. Extensive tests have been carried out on this undersea lightguide fiber cable to determine whether trans-oceanic undersea lightguide fiber cables are feasible and commercially practical.

The experimental undersea lightguide fiber cable linking the islands of Gran Canaria and Tenerife is approximately 120 kilometers in length and is comprised of six individual lightguide fibers, each surrounded by a helically-wound steel strength member. The steel strength members and the fibers surrounded thereby are mounted in an elastomer jacket. A copper sheath, covered with plastic, surrounds the elastomeric jacket containing the steel strength members and the fibers. Typically, each of the six individual fibers within the undersea cable is not of a unitary construction. Present day manufacturing practices make it difficult to produce a single fiber in excess of 15 km in length, whereas the length of the cable between regenerators was selected to be 60–70 km to minimize costs. Thus, each fiber within the cable was comprised of individual pieces (lengths) of fiber spliced end to end.

A problem encountered in fabricating the experimental undersea lightguide cable was determining which individual pieces within an inventory thereof should be selected in order to obtain a fiber having a prescribed length and transmission characteristics. When selecting individual pieces of fiber from the inventory, several criteria had to be satisfied. The cumulative loss of the selected pieces had to be less than a predetermined maximum value to minimize the loss of the fiber fabricated therefrom and thereby minimize the number of regenerators required for the undersea cable span. Also, the cumulative loss of the selected pieces had to be greater than a certain minimum value to assure that the overall loss of the fiber was sufficient to prevent the signals traveling therealong from overloading a regenerator. Overloading of a regenerator causes a condition known as "ringing" which will lead to distortion of the signals amplified thereby.

In terrestrial cables containing one or more lightguide fibers, comprised of individual fiber pieces spliced end to end, ringing is avoided by installing attenuators at selected lengths along the cable. Since the terrestrial cable can be readily attenuated, it is unnecessary to impose the criterion that the cumulative loss of the individual pieces comprising each fiber be above a certain minimum value during selection. Thus, the only criterion that must be satisfied in selecting the individual pieces needed to fabricate a fiber for a terrestrial cable is that the cumulative loss of the pieces be below a predetermined maximum value.

While installing attenuators at various lengths along a terrestrial lightguide cable is feasible, installation of attenuators at various lengths along the undersea lightguide cable is not. Therefore, to assure that each fiber within the undersea cable was sufficiently lossy to avoid ringing, the pieces comprising the fiber were selected such that the cumulative loss thereof was above a predetermined minimum value. Selecting the pieces comprising each fiber for the undersea cable such that the cumulative loss thereof was above a predetermined minimum value (and below a predetermined maximum value) also assured a relatively uniform loss from fiber to fiber. Loss uniformity from fiber to fiber within the undersea cable eliminates the need to know the exact losses of each individual piece comprising each fiber. The loss of any particular section of fiber can be determined, with relatively high accuracy, as a proportion of the total fiber loss on a length basis. Replacement of a damaged section of fiber can easily be accomplished simply by substituting an equivalent length piece of fiber having approximately the same overall loss per unit length. Repair of the cable at sea is thus facilitated.

Another consideration in selecting fibers from the inventory was maintaining the median loss per unit length of pieces substantially constant after selection. In practice, the loss per unit length of each piece is measured at 1290 nm, 1310 nm and 1330 nm in order to gauge the loss thereof within the desired wavelength range of 1290–1330 nm for the fiber to be fabricated therefrom. Typically, the loss of each piece at 1310 nm is lower than the loss at either 1290 nm or 1330 nm. Thus, for each piece, there will be some variation in loss per unit length among the wavelengths. If the selection of the pieces from the inventory was undertaken without regard to the distribution thereof, then the percentage of higher loss pieces would increase. The higher loss pieces are those having either a loss per unit length higher than the median loss per unit length of the pieces in the inventory or a variation in loss per unit length above a preset value. These higher loss pieces within the inventory are less versatile in that they are less usable in fabricating a fiber. Unless an effort is made to use the higher loss pieces in the inventory, they will accumulate and will ultimately have to be scrapped, thereby increasing fiber fabrication costs.

Thus, a problem exists in how to fabricate a fiber, having pre-specified loss characteristics, from individual fiber pieces which are selected from an inventory thereof such that the median loss per unit length of the pieces in the inventory remains generally constant.

BRIEF SUMMARY OF THE INVENTION

Briefly, the foregoing problem has been overcome by the method of the present invention for fabricating transmission media, having predetermined transmission characteristics, from an inventory containing pieces having different loss per unit lengths, so as to maintain the median loss per unit length of the pieces in inventory substantially constant after fabrication. Initially, the inventory is divided into a plurality of classes based on the following criteria: (1) whether each piece has a length above or below the average length of the pieces within the inventory, (2) whether each piece has a loss per unit length above or below the desired loss per unit length of the transmission media to be fabricated, and (3) whether each piece has a variation in loss above or below a preselected value. Thereafter, the classes are successively examined, beginning with the first one, to determine whether any piece therein has transmission characteristics suitable for fabricating the transmission media. If so, the suitable piece is selected. The step of successively examining the classes of pieces is repeated until the cumulative length of the selected pieces equals or exceeds the desired length of the transmission media to be fabricated. The selected pieces are then joined end to end.

BRIEF SUMMARY OF THE DRAWINGS

FIG. 2 is a simplified view of one of the fibers selected within the cable of FIG. 1;

FIG. 3 is a graphical representation of the desired length versus loss characteristics of the fiber of FIG. 2;

FIG. 6 is an enlarged view of a portion of the graph of FIG. 3; and

DETAILED DESCRIPTION

Figure 1:
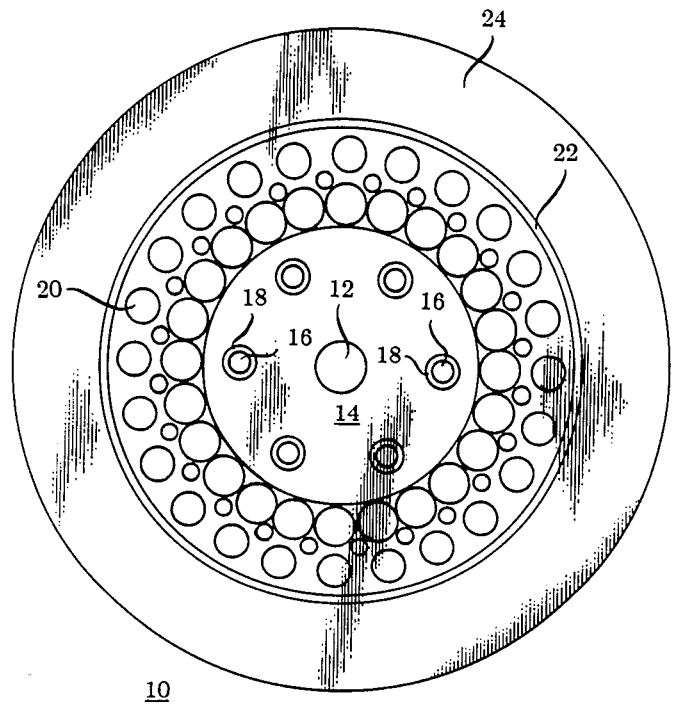
FIG. 1 is an end view of an undersea lightguide cable containing lightguide fibers selected in accordance with the present invention.

FIG. 1 is an end view of an experimental undersea lightguide fiber cable 10. The cable 10 comprises a kingwire 12 (e.g., steel) coaxially located within a cylindrical elastomer jacket 14. A plurality of lightguide fibers 16 are embedded within the elastomer jacket 14 so as to be equally spaced from each other and from the kingwire 12. Each fiber 16 is surrounded by a helically wound strength member 18 (e.g., steel) to give each fiber additional strength during laying of the cable 10.

A strand 20 (e.g., steel) surrounds the elastomer jacket 14 to provide a protective cage thereabout. The strand 20 is enclosed by a conductive sheath 22 (e.g., copper) which serves as a conductor to carry electrical power through the cable 10 to various regenerators (not shown) spaced therealong. The sea into which the cable 10 is laid serves as a return path for the electrical power. An insulative sleeve 24, typically made from low-density polyethylene, surrounds the sheath 22 to isolate it from the sea and sea ground potential. Although not shown, one or more strands of armor may be wrapped around the cable 10 to provide additional protection thereto.

In practice, each of the fibers 16 within the cable 10 is not of a unitary construction. Present day manufacturing practices make it extremely difficult to draw the fiber 16 in excess of 15 km. Typically, the average draw length is on the order of 6 km. To minimize system costs, the length of the cable 10 between a pair of regenerators (not shown) was chosen to be 60–70 km. Thus, as seen in FIG. 2, it was necessary to construct each fiber 16 from a plurality of individual pieces 26 of fiber spliced end to end. Since the overall loss of each fiber 16 depends on the cumulative loss of the individual pieces 26, care must be taken during the selection of the pieces to insure that the fiber meets certain pre-specified loss characteristics.

Referring to FIG. 3, there is shown a plot of the desired length versus loss for each fiber 16 (see FIGS. 1 and 2). The loss of each fiber 16 (see FIGS. 1 and 2), which is represented by the lightly drawn dash-dotted line in FIG. 3, varies linearly with the length thereof. The cumulative loss for each fiber 16 (see FIGS. 1 and 2) within a particular wavelength range (typically 1290–1330 nm) ideally should not exceed 25 dB over a distance of 60 km between regenerators. The maximum allowable cumulative loss for the fiber 16 for a given length thereof is often referred to as the loss budget of the fiber. The loss budget for the fiber 16 to be fabricated corresponds to the total desired loss for the fiber.

Typically, the total loss resulting from the splices between the individual pieces 26 (see FIG. 2) is on the order of 1 dB. The nominal loss per unit length for the fiber 16 of FIGS. 1 and 2 (including splices) will be given by the ratio of 25 dB/60 km or 0.4166 dB/km. The ratio of 25 dB/60 km corresponds to the slope m of the lightly drawn dash-dotted line in FIG. 3. In general terms, the slope m represents the desired loss per unit length of the fiber 16 to be fabricated To insure loss uniformity between the fibers 16 of FIGS. 1 and 2 within the cable 10 of FIG. 1, the loss per unit length of the fibers should be within 5% of each other. The darkly drawn dash-dotted lines $+d$ and $-d$ depicted in FIG. 3 above and below, respectively, the lightly drawn dash-dotted line of slope m, represent 105% and 95%, respectively, of the loss per unit length of each fiber 16 of FIGS. 1 and 2. Between the lines $+d$ and $-d$ is an area 28 which corresponds to the loss tolerance window of the fiber 16 of FIGS. 1 and 2. The loss tolerance window for the fiber 16 of FIGS. 1 and 2 defines the range of permissible values for the loss of the fiber at a given length thereof.

The size of the area 28 in the graph of FIG. 3 determines which combination of pieces 26 (see FIG. 2) within a large inventory thereof (not shown) is suitable for fabricating each fiber 16 of FIGS. 1 and 2. In choosing the individual pieces 26 of FIG. 2, care must be taken to assure that the cumulative loss of the selected pieces is within the loss tolerance window for the fiber 16 (see FIGS. 1 and 2) which is represented by the area 28 in the graph of FIG. 3. However, in choosing the pieces 26 from the inventory, it is also desirable to maintain the median loss per unit length of the pieces substantially the same as before selection.

Figure 4:
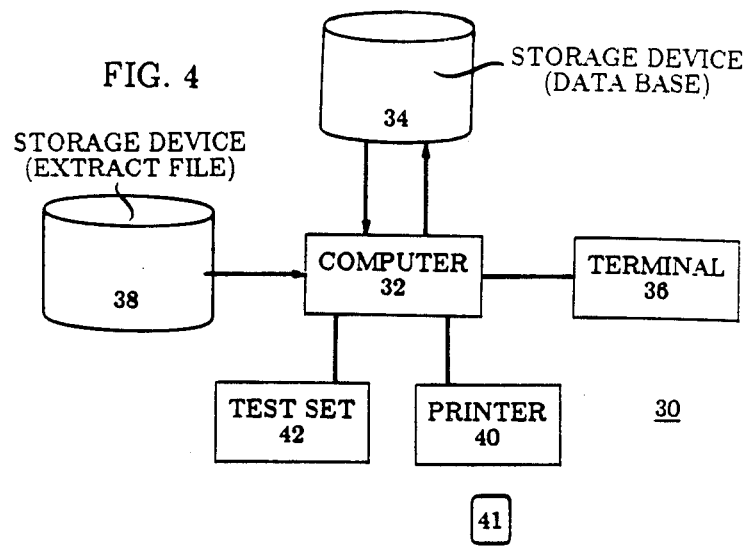
FIG. 4 is a block diagram of an apparatus for identifying those individual pieces of fiber within an inventory of such pieces which are suitable for fabricating the fiber of FIG. 2.

FIG. 4 is a block diagram of a system 30 for selecting the individual pieces 26 from the inventory so as to maintain the median loss per unit length of the pieces substantially the same as before selection. The system 30 of FIG. 4 is comprised of a computer 32 which is coupled to a mass storage device 34, typically comprised of at least one magnetic disk, which stores a data base containing information about each of the pieces 26 (see FIG. 2) in the inventory. Order information, describing the physical specifications and the transmission characteristics of each fiber 16 (see FIGS. 1 and 2) to be fabricated from the pieces 26 (see FIG. 2) within the inventory, is also contained within the data base stored in the mass storage device 34. Information about the pieces 26 (see FIG. 2) in the inventory and information about the fibers 16 (see FIGS. 1 and 2) to be fabricated therefrom is entered into the computer 32 via a terminal 36 for storage by the mass storage device 34.

In an exemplary embodiment, the computer 32 is also coupled to a second mass storage device 38 which stores an extract file containing only certain information about a particular number of pieces 26 in the inventory. Typically, the data base stored within the mass storage device 34 contains a great deal of information about each piece 26 such as an identification number unique thereto, the losses of the piece at several wavelengths (typically 1290 nm, 1310 nm and 1330 nm), the length and core diameter thereof, the date of manufacture and the lot number. Not all of this information is required in order to select the fiber pieces 26 (see FIG. 2) comprising each fiber 16 (see FIGS. 1 and 2). Further, not every piece 26, whose characteristics are contained in the data base stored by the mass storage device 34, may be suited for fabricating the fibers 16 (see FIGS. 1 and 2) described by the order information contained within the data base. For example, the core diameter of one or more of the pieces 26 within the inventory may be too large or too small to fabricate the fiber(s) 16 required to fill a particular order.

In practice, the extract file stored within the mass storage device 38 contains the identification number, loss data and the length of only those pieces 26 having the physical characteristics suited for fabricating the fiber(s) 16 required to fill a particular order. Rather than search through all of the data contained in the mass storage device 34 in order to determine which pieces 26 (see FIG. 2) are to be selected, the computer 32 only has to search through the extract file stored by the mass storage device 38. The extract file stored by the mass storage device 38 contains less data than the data base stored by the mass storage device 34. Thus, less time will be spent by the computer 32 in searching the extract file to select those pieces 26 (see FIG. 2) within the inventory which, when spliced end to end, will yield the fiber(s) 16 (see FIGS. 1 and 2) required to fill a particular order. The extract file could be stored in the mass storage device 34 containing the data base rather than being stored separately in the mass storage device 38. Thus, the mass storage device 38 could be deleted without adverse effect.

A printer 40 is coupled to the computer 32. The primary purpose of the printer 40 is to generate a ticket 41 which lists those pieces 26 selected by the computer 32 for fabricating each fiber 16 required to fill a particular order. The ticket 41 enables an operator to assemble the selected pieces 26 in the correct order for splicing. The printer 40 may also be used to print reports detailing the number and characteristics of the pieces 26 remaining in the inventory. A test set 42 is also coupled to the computer 32 for testing the actual characteristics of the fiber 16 obtained after the selected pieces 26 are spliced end to end. From information supplied from the test set 42, the computer 32 can verify that the fiber 16 fabricated from the selected pieces 26 in fact possesses the characteristics specified therefor.

Figure 5:
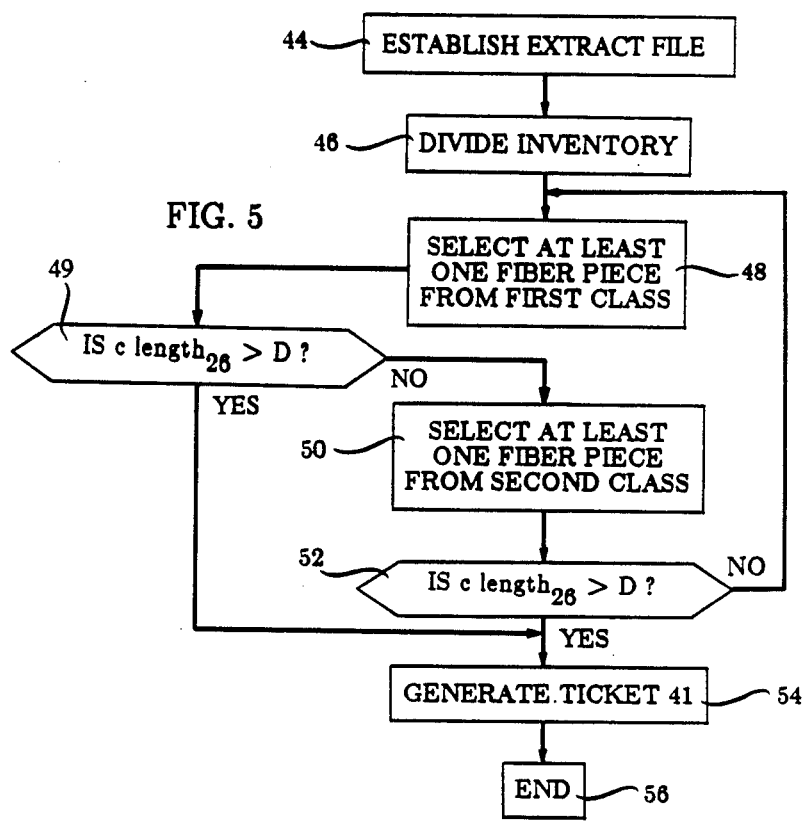
FIG. 5 is a flowchart representation of the program executed by the apparatus of FIG. 4 to identify the fiber pieces within the inventory.

FIG. 5 is a simplified flowchart of a program executed by the computer 32 of FIG. 4 to select pieces 26 for each fiber 16 so that the median loss per unit length of the pieces within the inventory remains substantially the same after selection. Initially, the computer 32 (see FIG. 4) creates the extract file and stores the file at the mass memory device 38 of FIG. 4 (step 44). To create the extract file, the computer 32 (see FIG. 4) first sorts the information contained in the data base stored in the mass storage device 34 to determine which order is to be filled. Then, the computer 32 (see FIG. 4) determines which of the pieces 26 in the inventory has the specified physical characteristics for each fiber 16 needed to fill the particular order. Once the computer 32 of FIG. 4 has determined which of the pieces 26 within the inventory has the requisite physical characteristics for fabricating each fiber 16, the length, identification number and loss characteristics of each of the suitable pieces are then stored in the mass memory device 38 of FIG. 4, creating the extract file.

Next, the data contained in the extract file is partitioned to group the pieces 26 described thereby into two classes (step 46). The criterion for separating the data is whether the loss per unit length of each piece 26 described by the extract file is above or below the desired loss per unit length (m) of the fiber 16 to be fabricated therefrom. If any piece has a loss per unit length exactly equal to the desired loss per unit length of the fiber 16, the piece is placed in the first of the two classes. Following step 46, the computer 32 (see FIG. 4) selects (step 48) from the first class of pieces 26 at least one piece which satisfies the following mathematical relationship:

$$[(m)(clength_{26})-(0.05)(LB)] < (closs_{26}) < [(m)(clength_{26})+(0.05)(LB)]$$

where $closs_{26}$ and $clength_{26}$ are the cumulative loss and the cumulative length, respectively, of the piece(s) selected thus far including the piece just selected), and LB is the loss budget (total desired loss) of the fiber 16 to be fabricated.

Stated in words, each piece 26 is selected such that the total loss of the piece(s) selected thus far (including the piece just selected) must be greater than the product of the cumulative length thereof and the desired loss per unit length of the fiber 16 of FIGS. 1 and 2, less a predetermined percentage (5%) of the loss budget for the fiber. The total loss of the pieces 26 (see FIG. 2) selected thus far must also be less than the sum of 5% of the loss budget of the fiber 16 and the product of the cumulative length of the pieces and the desired loss per unit length (m) of the fiber to be fabricated. Once selection of a particular one of the pieces 26 in the first class is completed, the data within the extract file stored by the mass storage device 38 describing the piece is flagged to prevent subsequent selection thereof. Following step 48, the computer 32 checks whether $clength_{26}$ is greater than D, the desired length of the fiber 16 to be fabricated (step 49). If $clength_{26}$ is less than D, then program execution branches to step 50.

During step 50, the computer 32 selects, from the second class, at least one piece 26 which satisfies the same mathematical relationship as the piece(s) selected from the first class. In other words, the cumulative loss of the piece(s) 26 selected thus far from both classes (including the one just selected) may not differ from the product of the cumulative length thereof and the desired loss per unit length (m) of the fiber 16 (see FIGS. 1 and 2) to be fabricated, by more than 5% of the loss budget for the fiber. The data in the extract file describing the piece(s) 26 selected from the second class are flagged to designate that the piece(s) cannot be selected again.

Referring to FIG. 6, there is shown a portion of the graph of FIG. 3 which depicts the loss versus length characteristic of the fiber 16 (see FIGS. 1 and 2). The loss versus length characteristics of a pair of pieces 26, each selected by the computer 32 (see FIG. 4) during a separate one of the steps 48 and 50 (see FIG. 5), are depicted in FIG. 6 by a separate one of the pair of dashed lines. The pieces 26 selected during steps 48 and 50 (see FIG. 5) each have a loss per unit length well below, and well above, respectively, the desired loss per unit length of the fiber 16 which is represented by the slope m of the lightly drawn dash-dotted line in FIG. 6. However, the cumulative loss of the pieces 26 selected during the steps 46 and 48 of FIG. 5 is within the loss tolerance window of the fiber 16 (see FIGS. 1 and 2) which is represented by the area 28 in FIG. 6.

As may be appreciated from FIG. 6, it is possible to fabricate the fiber 16 by sequentially selecting pieces 26, each having a loss per unit length less than and greater than m, respectively, so as to "zigzag" within the area 28. However, when the pieces 26 are spliced end to end, the loss per unit length of the resultant fiber 16 fabricated therefrom follows a straight line path. In addition, by alternately selecting the pieces 26 from the first and second classes in the manner described, the median loss per unit length of the pieces remaining in inventory remains substantially constant. Maintaining the median loss per unit length of the pieces 26 in the inventory substantially constant helps assure that additional fibers 16 can be fabricated from the remaining pieces 26 in the inventory.

Referring to FIG. 5, following step 50, the computer 32 executes step 52, whereupon the computer determines whether the cumulative length clength$_{26}$ of the pieces 26 selected thus far from both classes equals or exceeds a value D, representing the desired length of the fiber 16 specified by the order information contained in the extract file. If the value of clength$_{26}$ is less than D, then program execution branches back to step 48. Otherwise, program execution branches to step 54, whereupon the computer 32 causes the printer 40 of FIG. 4 to generate the ticket 41 which lists the previously selected pieces 26 (by their identification number) in the order in which they were selected. Program execution also branches to step 54 when, after step 49, the value of clength$_{26}$ exceeds D. Following step 54, program execution ends (step 56).

In selecting the pieces 26 (see FIG. 2), it is desirable that each piece have acceptable loss characteristics over a wavelength range of 1290-1330 nm for the fiber 16. Generally, if the cumulative loss of the selected pieces 26, as measured at 1290 nm, 1310 nm and 1330 nm, is within the minimum and maximum allowable loss values for the fiber 16 of FIGS. 1 and 2, the selected pieces will have acceptable losses within the range of 1290-1330 nm. During steps 48 and 50 of FIG. 5, the cumulative loss of the selected pieces 26, at each of the wavelengths 1290 nm, 1310 nm and 1330 nm, is examined. The purpose of such an examination is to determine whether the cumulative loss of the pieces 26 at each wavelength is within the loss tolerance window of the fiber 16 (see FIGS. 1 and 2) to be fabricated.

The program described in flowchart form in FIG. 5 for selecting the pieces 26 (see FIG. 2) assumes that the variation in the loss per unit length of each piece among the wavelengths 1290 nm, 1310 nm and 1330 nm is small. This assumption is not unreasonable since for most of the pieces 26 in the inventory, the loss variation per unit length among the wavelengths 1290 nm, 1310 nm, and 1330 nm is typically $\geq 0.02$ dB/km. Usually, the lowest loss per unit length for every piece 26 is measured at 1310 nm, with higher losses occurring at each of the other two wavelengths. Rather than speak of the variation in loss per unit length of each piece 26 among the wavelengths 1290 nm, 1310 nm and 1330 nm, it is useful to define another quantity, the percentage loss variation. The percentage loss variation of each piece 26 is given by the expression $(L_h - L_l)/L_h$ where $L_h$ and $L_l$ are the highest and lowest loss per unit length.

Although for the majority of pieces 26 within the inventory, the percentage loss variation is small, the percentage loss variation may become significant when the fiber 16 to be fabricated therefrom is long (>30-40 km). When the selected pieces 26 are joined end to end, the losses accumulate. Even if the percentage loss variation of each selected piece 26 is small, the cumulative loss of several pieces joined end to end, as measured at one of the wavelengths 1290 nm, 1310 nm, and 1330 nm, may fall outside of the loss tolerance window for the fiber 16. The greater the number of selected pieces 26 which are joined end to end, the greater the likelihood that total cumulative loss of the pieces at one wavelength will fall outside the loss tolerance window for the fiber 16 unless account is taken of the percentage loss variation of the selected pieces.

Figure 7:
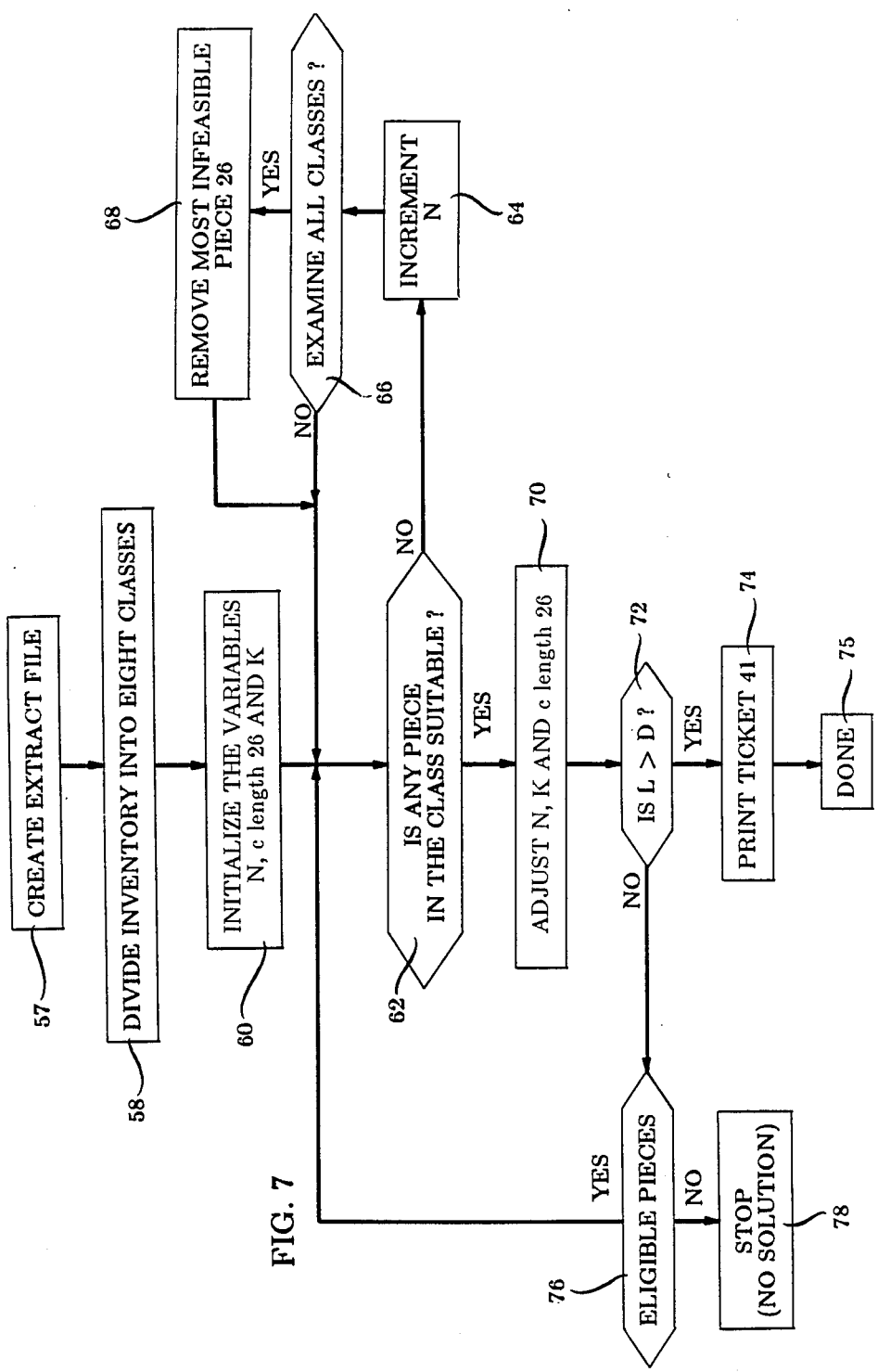
FIG. 7 is a flowchart representation of an alternate program for identifying those pieces within the inventory suitable for fabricating the fiber of FIG. 2.

FIG. 7 is a flowchart representation of an alternative embodiment of a computer program to be executed by the processor 34 (see FIG. 4) for selecting the pieces 26 in accordance with the variation in loss thereof among the wavelengths 1290 nm, 1310 nm and 1330 nm. The program of FIG. 7 is designed to be substituted for the program previously described in FIG. 5. Referring to FIG. 7, initially, the extract file is created (step 57) in the same manner as during step 44 (see FIG. 5). Next, the data contained in the extract file describing each of the pieces 26 are separated to divide the pieces into eight classes (step 58). The following three criteria are employed in separating the pieces 26 (see FIG. 2) into the eight classes:

(a) whether the length thereof is longer or shorter than the average length of the pieces within the inventory;

(b) whether the loss per unit length thereof is higher or lower than the desired loss per unit length of the fiber 16 (see FIGS. 1 and 2) to be fabricated; and (c) whether the percentage loss variation is higher or lower than a predetermined value (typically 7%).

The eight classes are defined as follows:

| Class No. | Length | Loss | Percentage Loss Variation |
|---|---|---|---|
| 0 | long | low | low |
| 1 | short | low | low |
| 2 | long | high | low |
| 3 | short | high | low |
| 4 | long | high | high |
| 5 | short | high | high |
| 6 | long | low | high |
| 7 | short | low | high |

In classifying the pieces 26 in the above-described manner, it is often useful to reserve one or more pieces within each of the classes 0-3 as replacements in the event that breaks occur in the fiber 16 during splicing. These pieces 26, which are designated as replacement pieces, are only used for that purpose and are not considered for initial selection. If no replacement pieces 26 are reserved, then the inventory could become depleted of suitable pieces before it becomes necessary to select a replacement due to a break during splicing.

Following step 58, three running variables, clength$_{26}$, K and N, are initialized such that clength$_{26}$=0, K=0 and N=7 (step 60). The variables clength$_{26}$, K and N are defined as follows: clength$_{26}$—the cumulative length of the pieces 26 selected thus far;

K—the number of pieces 26 that have been selected thus far;

N—the class from which the last piece was selected.

Following step 60, the class whose number is given by (N+1) modulus 8 is examined (step 62) to determine whether one of the pieces 26 therein is suited for fabricating the fiber 16. A piece 26 within the class is suitable if the loss thereof, together with the cumulative loss of the previously selected pieces as measured at 1290 nm, 1310 nm and 1330 nm, is within the loss tolerance window for the fiber 16. A piece 26 within the class is unsuited if the loss thereof, at any of the three wavelengths (1290 nm, 1310 nm and 1330 nm), together with the cumulative loss at that wavelength for the previously selected pieces, falls outside of the loss tolerance window for the fiber 16. Thus, the same criterion used for selecting pieces during steps 48 and 50 of FIG. 5 is employed during step 62.

In addition, there are two additional constraints that the piece 26 within the particular class must satisfy before the piece can be considered suitable for selection. In order for the piece 26 (see FIG. 2) to be considered suitable, the following relationships must be satisfied:

$C_{1290}-C_{1310} \geq 2$ clength$_{26}\Delta$/D; and $C_{1330}-C_{1310} \geq 2$ clength$_{26}\Delta$/D where $C_{1290}$, $C_{1310}$, and $C_{1330}$ each represent the cumulative loss of the pieces 26 selected thus far (as well as the one under consideration for selection) at a separate one of the wavelengths 1290 nm, 1310 nm and 1330 nm, respectively;

$\Delta$ is a tolerance factor, typically equal to 75% of the product 0.05 (LB); and D is the desired length of the fiber 16 (see FIGS. 1 and 2).

The reason for imposing these two additional constraints is that the quantities $C_{1330}-C_{1310}$ and $C_{1290}-C_{1310}$ both almost always increase with the length of each piece 26. By monitoring these two quantities, a measure can be had of how much spread remains within the loss tolerance window for the fiber 16. The amount of spread within the loss tolerance window for the fiber 16 is defined by the difference between the maximum of $C_{1290}$, $C_{1310}$ and $C_{1330}$ and the sum of the two products (clength$_{26}$)(m) and 0.05(LB).

The larger the amount of the spread, the greater the likelihood that a piece 26 having a high percentage loss variation (>7%) can be chosen. Those pieces 26 having a high percentage loss variation are not plentiful in the inventory. However, such pieces 26 are not very versatile in that they are not often selected for fabricating the fibers 16. Unless the pieces 26 within the inventory which have a high percentage loss variation are used, they will build up in the inventory and ultimately may have to be scrapped, which undesirably increases fabrication costs of the fiber 16.

If, after step 62 of FIG. 7, the particular class does not contain any pieces 26 satisfying the constraints given above, then program execution branches to step 64 whereupon the variable N is incremented. Normally, N is incremented by one so that the next consecutive class can be examined. However, in certain instances, it is desirable to skip certain classes to maximize the likelihood that a piece 26 will be chosen from a class containing pieces having a high percentage loss variation (>7%). When the difference between D, the desired length of the fiber 16, and clength$_{26}$, the cumulative length of the pieces 26 selected thus far, is greater than 13 km, or the piece 26 to be chosen is a replacement for one previously selected, then N is incremented such that classes 2 and 3 are skipped unless all the other classes have been examined.

The reason why classes 2 and 3 are skipped under such conditions is that the pieces 26 within these classes are very versatile in that they can more readily be used to fabricate the fibers 16 than the pieces in classes 4–7. If the piece 26 to be chosen is a replacement, or if D−clength$_{26}$>13 km, then there is a good likelihood that a selection can be made from one of the classes 4–7. However, if classes 2 and 3 are not skipped, then the selection will more likely be made from one of these classes rather that from a class of less desirable piece. For the conditions when D−clength$_{26}$<13 km, and the piece 26 to be chosen is an initial or virgin selection, then classes 0, 2 and 3 are skipped to favor selection of shorter rather that longer pieces.

Following step 64, the computer 32 determines whether all eight classes have been examined (step 66). If not, then program execution branches back to step 62 whereupon the next class is examined for piece. 26 (see FIG. 2) that are suitable. When all the classes have been examined but no suitable piece 26 (see FIG. 2) has been found in any of them, the previously selected piece that contributed most to the infeasibility (i.e., the one having the highest lunless all the othe loss or percentage loss variation) is deleted from those already selected (step 68). When an infeasible piece is deleted, the variables Clength$_{26}$ and K must of course be readjusted to reflect absence of the deleted piece. After step 68, program execution branches back to step 62.

When a suitable piece 26 has been found upon examination of the current class during step 62, then N and K are both incremented by one and clength$_{26}$ is augmented by the length of the just-selected piece (step 70). Also, the data within the extract file stored by the mass memory storage device 38 (see FIG. 4) describing the just-selected piece is flagged to designate that the piece has been selected and is no longer available for fabricating another fiber 16.

Following step 70, the just-augmented value of clength$_{26}$ is examined during step 72 to determine whether the value thereof equals or exceeds D, the desired length of the fiber 16 to be fabricated. If clength$_{26} \geq$D, then all of the pieces 26 for the fiber 16 have now been selected. Next, the ticket 41 is printed (step 74), listing the pieces 26 in the order they were selected. Following step 74, program execution is done (step 75).

However, when D$\geq$clength$_{26}$, then, following step 72, program selection branches to step 76 whereupon the computer 32 determines whether there are still pieces 26 within the inventory suitable for fabricating the fiber 16. If so, then program execution branches to step 62. Otherwise, program execution stops (step 78) because the fiber 16 cannot be fabricated from the remaining pieces 26 stored in the inventory.

In some instances, a limit may be imposed on the number of splices within each fiber 16. The number of splices equals one less than the number of pieces 26 comprising the fiber 16. In order to avoid exceeding the maximum number of splices within the fiber 16, it may be necessary to modify the program slightly to take account of the value of K. If K becomes too large, then it may be necessary to restart the selection process.

The pieces 26 (see FIG. 2) selected during execution of the program of FIG. 7 will have varying losses, just as do the pieces selected during execution of the program of FIG. 5. The loss versus length characteristics of the pieces 26 (see FIG. 2) selected during execution of the program of FIG. 7, if plotted in FIG. 6, would yield the same zigzag pattern as described for the pieces selected during steps 48 and 50 of FIG. 5. Such a result occurs because the same criterion used to choose fibers during execution of the program of FIG. 5 is also incorporated in the program of FIG. 7. Thus, the pieces 26 (see FIG. 2) chosen during execution of the program of FIG. 7 are alternately selected from classes containing pieces having a loss per unit length above and below the desired loss per unit length of the fiber 16.

It is to be understood that the embodiments herein described are merely illustrative of the principles of the present invention. Various modifications and changes may be made by those skilled in the art which will embody the principles of the invention and fall within the spirit and scope thereof. For example, while the invention has been described with respect to undersea lightguide fiber cable, it is equally applicable to other types of lightguide cable, and to transmission media of the type used to carry electromagnetic signals of different wavelengths.

What is claimed is:

1. A method for fabricating a transmission media, comprising the steps of:
    selecting a plurality of pieces of transmission media from an inventory containing pieces having different lengths, different loss per unit length and different variation in loss; and
    joining the selected pieces end-to-end, characterized in that said pieces are selected so that the median loss per unit length of the pieces remaining in inventory after selection remains substantially the same after selection, said selecting step including the steps of:
    (a) establishing different classes of pieces within the inventory based on whether:
        (1) each piece is longer or shorter than the average length of the pieces in the inventory;
        (2) each piece has a loss per unit length above or below a desired loss per unit length of the transmission media to be fabricated; and
        (3) each piece has a variation in loss above or below a predetermined value;
    (b) successively examining each class to determine if any of the pieces therein are suitable for fabricating the transmission media based on the characteristics of said any piece and of those previously selected pieces; and
    (c) repeating the step of successively examining the classes until the cumulative length of the pieces selected is at least equal to the desired length of the transmission media to be fabricated.

2. The method according to claim 1, characterized in that at least one piece is selected from each class only if the cumulative loss of the piece to be selected, together with the cumulative loss of the pieces already selected is within a predetermined percentage of the product of the desired loss per unit length of the transmission media to be fabricated and the cumulative length of the pieces selected thus far and the length of the piece to be selected.

3. The method accordrng to claim 2, characterized in that a piece is selected from each class only if the difference in the cumulative loss of the pieces selected thus far measured at a first and a second wavelength and the differences in the cumulative losses measured at a third and the second wavelength are each less than a preselected fraction of the product of the total desired loss of the transmission media to be fabricated and the ratio of the cumulative length of the pieces selected thus far (and the piece to be selected) to the desired length of the transmission media to be fabricated.

4. The method according to claim 1, characterized in that those classes containing pieces whose loss per unit length is above the desired loss per unit length of the transmission media to be fabricated and whose loss variation is below a predetermined value are skipped from examination when the difference between the desired length of the transmission media and the cumulative length of the pieces selected thus far is more than a predetermined value.

5. A method for fabricating a lightguide fiber cable, comprising the steps of:
    selecting a plurality of pieces of lightguide fiber from an inventory containing pieces having different lengths, different loss per unit length and different variation in loss; and
    joining the selected pieces of lightguide fiber end-to-end characterized in that said pieces are selected so that the median loss per unit length of the pieces remaining in inventory after selection remains substantially constant, said selecting step including the steps of:
    (a) establishing different classes of pieces within the inventory based on whether:
        (1) each piece is longer or shorter than the average length of the pieces in the inventory;
        (2) each piece has a loss per unit length above or below the desired loss per unit length of the lightguide fiber to be fabricated; and
        (3) each piece has a variation in loss above or below a predetermined value;
    (b) successively examining each class to determine if any of the pieces therein are suitable for fabricating the lightguide fiber based on the characteristics of said any piece and of those previously selected pieces; and
    (c) repeating the step of successively examining the classes until the cumulative length of the pieces selected is at least equal to the desired length of the lightguide fiber cable to be fabricated.

6. The method according to claim 5, characterized in that at least one piece is selected from each class only if the cumulative loss of the piece to be selected, together with the cumulative loss of the pieces already selected, is within a predetermined percentage of the product of the desired loss per unit length of the lightguide fiber cable to be fabricated and the cumulative length of the pieces selected thus far, including the piece to be selected 7. The method according to claim 5, characterized in that a piece is selected from each class only if the difference in the cumulative loss of the pieces selected thus far (including the piece to be selected) measured at a first and a second wavelength and the differences in the cumulative losses measured at a third and the second wavelength are less than a preselected fraction of the product of the total desired loss of the transmission media to be fabricated and the ratio of the cumulative length of the pieces selected thus far (and the piece to be selected) to the desired length of the lightguide fiber cable to be fabricated.

8. The method according to claim 5, CHARACTERIZED IN THAT those classes containing pieces whose loss per unit length is above the desired loss per unit length of the lightguide fiber to be fabricated and whose loss variation is below a predetermined value are skipped from examination when the difference between the desired length of the transmission media and the cumulative length of the pieces selected thus far is more than a predetermined value.

9. A method for fabricating a transmission media, comprising the steps of:
 selecting a plurality of pieces of transmission media from an inventory containing pieces having different lengths, different loss per unit length and different variation in loss; and
 joining the selected pieces end-to-end, CHARACTERIZED IN THAT said pieces are selected so that the median loss per unit length of the pieces remaining in inventory after selection remains substantially constant, said selecting step including the steps of:
 (a) establishing different classes of pieces within the inventory based on whether;
   (1) each piece is longer or shorter than the average length of the pieces in the inventory;
   (2) each piece has a median loss per unit length above or below the desired loss per unit length of the transmission media to be fabricated; and
   (3) each piece has a variation in loss above or below a predetermined value;
 (b) successively examining each class and selecting at least one piece therefrom only if:
   (1) the cumulative loss of the piece to be selected, together with the cumulative loss of the pieces already selected, is within a predetermined percentage of the product of the desired loss per unit length of the transmission media to be fabricated and the cumulative length of the pieces already selected and the piece to be selected; and
 (c) repeating the step of successively examining the classes until the cumulative length of the selected pieces is at least as great as the desired length of the transmission media to be fabricated.

* * * * *

UNITED STATES PATENT AND TRADEMARK OFFICE
CERTIFICATE OF CORRECTION

PATENT NO. : 4,798,641　　　　　　　　　　　　　Page 1 of 2
DATED : January 17, 1989
INVENTOR(S) : M. R. Murr, J. R. Rajasekera, B. C. Vrieland It is certified that error appears in the above—identified patent and that said Letters Patent is hereby corrected as shown below:

Abstract, line 9　　　　　　　　　　"inventory." should read --inventory,--.

Column 4, line 32 and 33　　　　　"the loss per unit" should read
--the median loss per unit--.

Column 6, lines 28 and 29　　　　" $< [(m)(-clength_{26}) +$ "
should read -- $< [(m)(clength_{26}) +$ --.

Column 6, line 32　　　　　　　　　"thus far including"
should read --thus far (including --.

Column 7, line 20　　　　　　　　　"the loss"
should read --the desired loss--.

Column 7, line 68　　　　　　　　　" typically $\geq 0.02 dB/km.$ "
should read -- typically $\leq 0.02 dB/km.$ --.

Column 9, lines 32 and 33

$$"C_{1290} - C_{1310} \geq 2 \text{ clength}_{26} \Delta/D; \text{ and}$$

$$"C_{1330} - C_{1310} \geq 2 \text{ clength}_{26} \Delta/D"$$

should read　　$--C_{1290} - C_{1310} \leq 2 \text{ clength}_{26} \Delta/D; \text{ and}$ $$C_{1330} - C_{1310} \leq 2 \text{ clength}_{26} \Delta/D --.$$

UNITED STATES PATENT AND TRADEMARK OFFICE
CERTIFICATE OF CORRECTION

PATENT NO. : 4,798,641
DATED : January 17, 1989
INVENTOR(S) : M. R. Murr, J. R. Rajasekera, B. C. Vrieland It is certified that error appears in the above—identified patent and that said Letters Patent is hereby corrected as shown below:

Column 10, line 29      "for piece. 26"
should read --for pieces 26--.

Column 10, line 34      "the highest lunless all the othe loss"
should read --the highest loss--.

Column 10, line 58      "However, when $D \geq clength_{26}$, then,"
should read --However, when $D > clength_{26}$, then,--.

Claim 2, column 11, line 66      "selected is"
should read --selected, is--.

Claim 3, column 12, line 7      "far measured"
should read --far (including the piece to be selected) measured--.

Claim 5, column 12, line 31      "end characterized" should read --end, characterized--.

Signed and Sealed this

Eighth Day of August, 1989

Attest:

DONALD J. QUIGG

Attesting Officer      Commissioner of Patents and Trademarks